United States Patent [19]

Clendinning et al.

[11] Patent Number: 4,767,838

[45] Date of Patent: Aug. 30, 1988

[54] CHAIN-EXTENDED POLY(ARYL ETHER KETONES)

[75] Inventors: Robert A. Clendinning, New Providence; George T. Kwiatkowski, Green Brook, both of N.J.

[73] Assignee: Amoco Corporation, Chicago, Ill.

[21] Appl. No.: 12,630

[22] Filed: Feb. 9, 1987

Related U.S. Application Data

[63] Continuation-in-part of Ser. No. 743,957, Jun. 12, 1985, abandoned, and a continuation of Ser. No. 881,565, Jul. 3, 1986, abandoned.

[51] Int. Cl.⁴ .................. C08G 8/02; C08G 14/00
[52] U.S. Cl. .................. 528/125; 528/126; 528/128; 528/173; 528/176; 528/179; 528/182; 528/193; 528/194; 560/51; 525/471
[58] Field of Search .............. 528/125, 126, 128, 173, 528/176, 179, 182, 193, 194; 525/471

[56] References Cited

U.S. PATENT DOCUMENTS 4,638,044 1/1987 Kelsey .................. 528/125

Primary Examiner—Lucille M. Phynes
Attorney, Agent, or Firm—Donald M. Papuga; William H. Magidson; Ralph C. Medhurst

[57] ABSTRACT

Described herein are novel crystalline chain extended poly(aryl ether ketones) which display excellent toughness, fabricability and very good high temperature and solvent resistance.

8 Claims, No Drawings

CHAIN-EXTENDED POLY(ARYL ETHER KETONES)

RELATED APLICATIONS

This application is a continuation-in-part of U.S. application Ser. No. 743,957, filed June 12, 1985, now abandoned, and Continuation application Ser. No. 881,565, filed July 3, 1986, and now abandoned.

FIELD OF THE INVENTION

This invention is directed to novel crystalline chain extended polymers containing segments of crystalline poly(aryl ether ketones). The novel materials are easy to prepare and display excellent toughness, fabricability, and very good high temperature and solvent resistance.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE can be formed by the nucleophilic aromatic substitution (condenstion) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol 22, August, pp. 1096-1103; Blundell et al., Polymer, 1983 vol. 24, August, pp. 953-958, Atwood et al., Polymer Preprints, 20, no. 1, April 1979, pp. 191-194; and Rueda et al., Polymer Communications, 1983, vol. 24, September, pp. 258-260. In early to mid-1970, Raychem Corp. commercially introduced a PAEK called STILANT, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lbs/in$^2$) in the tensile impact test (ASTM D-1822). They have potential for a wide variety of uses, but because of the significant cost to manufacture them, they are expensive polymers. Their favorable properties classes them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions generally display good toughness and acceptable mechanical properties.

THE INVENTION

The present invention is directed to chain extended poly(aryl ether ketone) polymers. Both the preparation of the starting poly(aryl ether ketone) segments and their subsequent coupling with a diphenol are performed via the nucleophilic route, i.e. using a base and an aprotic solvent. Products having superior toughness, good fabricability, and excellent solvent and temperature resistance are obtained.

In one aspect, the polymers of the present invention comprise a poly(aryl ether ketone) of the following formula:

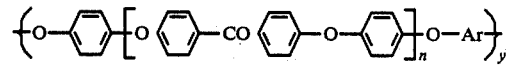

y is greater than one, and Ar is a residue of an activated dihalo or dinitro aromatic compound selected from one or more of the following:

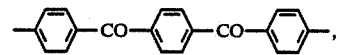

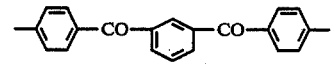

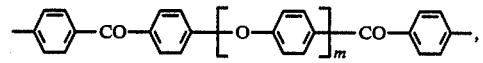

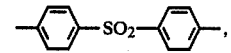

and

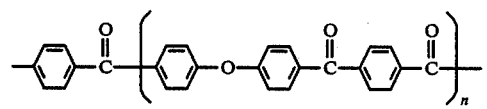

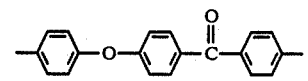

or mixtures thereof, and wherein m is 1 to 3, and each n is independently at least 2.

The polymers of the instant invention are prepared by the process shown in the equations that follow:

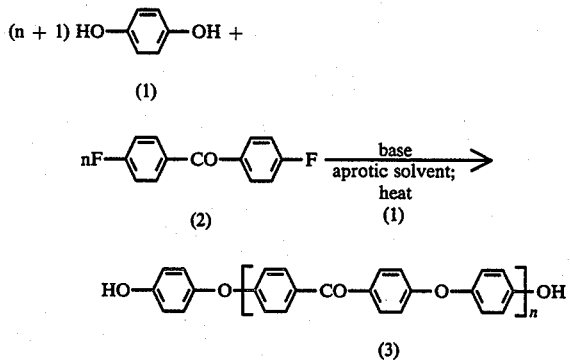

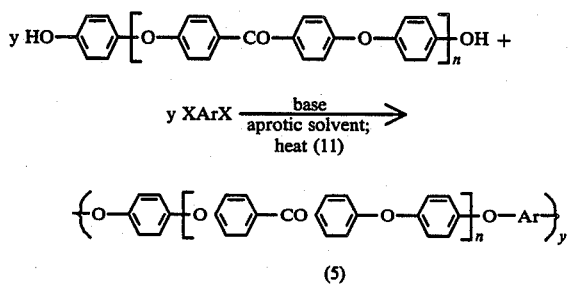

The intermediate (3) can be prepared at any desired molecular weight. The higher the excess of the hydroquinone reactant, the lower the molecular weight of the resulting precursor. Generally, the value of n is such that the intermediate has a molecular weight of less than about 10,000. For the second step, the dihydroxyl terminated precursor (3) is extended to the desired high molecular weight poly(aryl ether ketones) by condensation with a different activated dihaloaromatic compound, viz In the formulae above X denotes a halogen such as chlorine, fluorine, or bromine, or a nitro group, and Ar is a divalent aromatic residue containing activating groups in positions ortho and/or para to the halogen or nitro functions with the proviso that Ar is not a residuum of 4,4'-dihalobenzophenone.

It is to be noted that the steps depicted in the equations (I) and (II) can be performed either with the isolation of the intermediate (3), or in a one-pot operation in which the preparation of the precursor is followed directly by its coupling to the final copolymer (5). Obviously, mixtures of two or more coupling agents of the formula (4) can also be used in the process of the instant invention.

Any dihalobenzenoid or dinitrobenzenoid compound or mixtures thereof can be employed in this invention which compound or compounds have the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma value, as set forth in J. F. Bunnett in Chem. Rev. 49, 273 (1951) and Quart. Rev., 12, 1 (1958). See also Taft, Steric Effects *in Organic Chemistry*, John Wiley & Sons (1956), chapter 13; *Chem, Rev.*, 53, 222; JACS, 74,3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine. (b) divalent groups which can activate displacement of halogens or nitro groups on two different rings, such as the sulfone group

the carbonyl group

the vinylene group

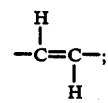

the sulfoxide group

the azo group —N=N—; the saturated fluorocarbon groups —CF$_2$CF$_2$—; organic phosphine oxides

where R$_2$ is a hydrocarbon group, and the ethylidene group

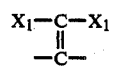

where X$_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

The preferred coupling agents are represented by the formulae (6), (7), (8) and (9)

The molecular weight of the precursor (3) can vary from as low as that of the dimer (i.e. when n=2) to as high as about 10,000.

An alternative preparation of the coupled poly(aryl ether ketones) of the instant invention involves the initial preparation of a dihalo-terminated precursor (10)-equation (III):

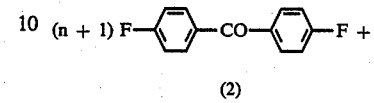

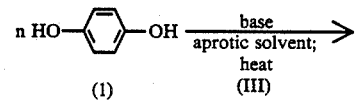

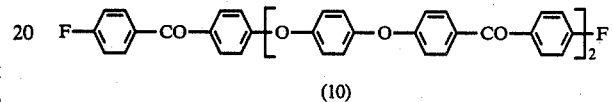

The molecular weight of (10) can be controlled in a manner similar to that utilized for the control of the molecular weight of (3). Precursor (10) is condensed either after isolation and purification or directly as pre-

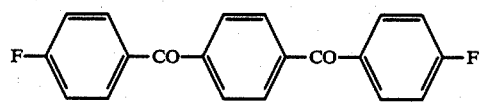

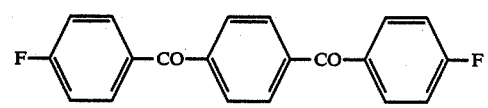

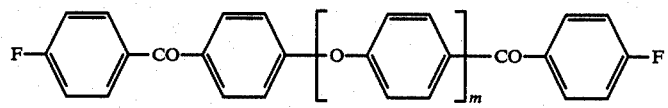

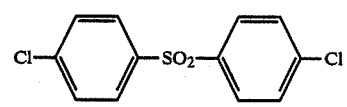

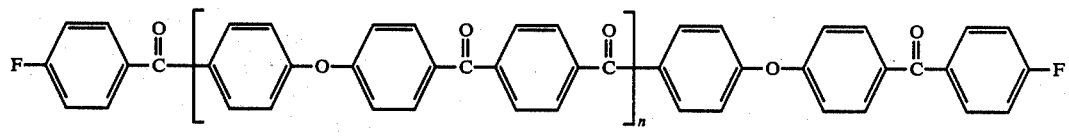

wherein m is 1 to 3. The most preferred coupling agents are selected from the group of the difluro-compounds (6), (7), and (8).

pared, with a diphenol or a mixture of diphenols to give the final copolymer-equation (IV).

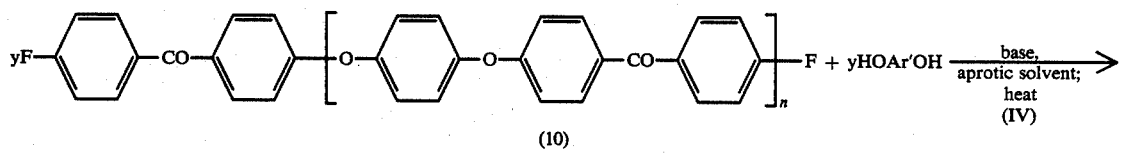

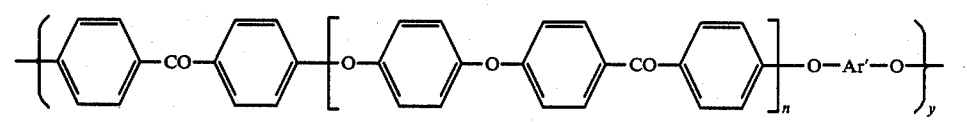

In the formulae above the group Ar' is the residue of a diphenol different from hydroquinone. The diphenol can be, for example, a dihydroxydiphenyl alkane or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols"- 'are also highly valuable and preferred. These materials are the bisphenols of a symmetrical or unsymmetrical joining group, the latter, for example, being an ether oxygen (—O—), carbonyl

sulfone

or hydrocarbon residue in which the two phenolic nuclei are joined to the same or different carbon atoms of the residue.

Such dinuclear phenols can be characterized as having the structure:

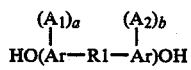

wherein Ar is an aromatic group and preferably is a phenylene group, A1 and A2 can be the same or different inert substituent groups such as alkyl groups having from 1 to 4 carbons atoms, halogen atoms, i.e., fluorine, chlorine, bromine or iodine, or alkoxy radicals having from 1 to 4 carbon atoms, a and b are integers having a value of from 0 to 4, inclusive, and R1 is representative of a bond between aromatic carbon atoms as in a dihydroxy-diphenyl, such as 4,4', 3,3', or 4,3'-dihydroxydiphenyl; or is a divalent radical, including, for example, radicals such as

—O—, —S—, —SO2, and divalent hydrocarbon radicals such as alkylene, alkylidene, cycloalkylene, cycloalkylidene, or the halogen, alkyl, aryl or like substituted alkylene, alkylidene and cycloaliphatic radicals or an aromatic radical; it may also represent rings fused to both Ar groups.

Examples of specific dihydric polynuclear phenols include among others the bis-(hydroxyphenyl) alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3,-hexafluoropropane, and the like;

di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3'-,dihydroxydiphenyl ethers, 4,4'-dihydroxy-2,6-dimethyldiphenyl ether,bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, and 4,4'-dihydroxy-3,6-dimethoxydiphenyl ether.

di(hydroxydiphenyl)ketones such as the 4,3'-, 4,4'-, 4,2', 2,2', and 2,3'-dihydroxybenzophenones; dihydroxy-diketones such as 1,4-bis(4'-hydroxybenzoyl)benzene, 4,4'-bis(4''-hydroxybenzoyl)diphenyl ether, 1,3-bis(4'-hydroxybenzoyl)benzene; fused ring polynuclear diphenols such as the dihydroxynaphthalenes, dihydroxyanthracenes, and dihydroxyphenanthrenes.

The preferred diphenolic coupling agents correspond to the formulae shown

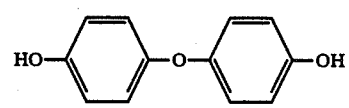

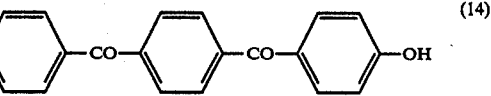

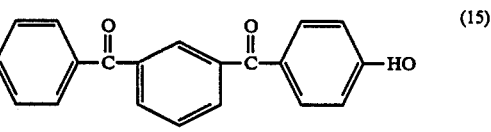

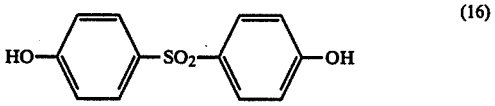

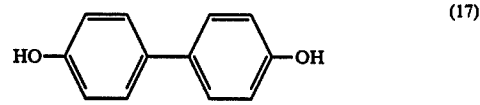

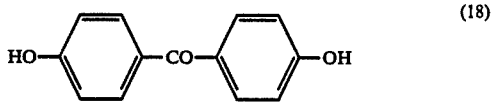

Compounds (13, (14), (17) and (18) are most preferred for the purposes of the present invention.

The molecular weight of the precursor (10) can vary from as low as that of the dimer (i.e. where n=2) to as high as about 10,000.

Both the precursors and the final polymers are prepared in solution, using the nucleophilic polycondensation reaction.

European patent application No.1,256,816, filed Apr. 19, 1984, based for priority upon British patent application No. 8,313,110, filed May 12, 1983, is directed to a method for increasing the molecular weight by melt polymerization of a poly(aryl ether) such as PEEK.

The process of European patent application No. 1,256,816, provides a basis by melt polymerization above the crystalline melting point of the poly(aryl ether) to increase the molecular weight by chain extension of polymer blocks. The application theorizes that the procedure can be used for making the block copolymers described in U.S. Pat. Nos. 4,052,365 and 4,268,635. Implicit problems associated in the process of this application are the difficulty in controlling the molecular weight of the resulting polymer and/or limiting isomerization and the problems associated with branching. The process of this European application would appear to be advantageous in making composites where the linearity and solution properties of the final polymer are not so critical.

The reactions are carried out by heating a mixture of the said monomers or precursor (or precursors) with the appropriate monomers at a temperature of from about 100° to about 400° C. The reactions are conducted in the presence of an alkali metal carbonate or bicarbonate. Preferably a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.01 to about 0.25 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g. 100° to 250° C., the water should be removed, e.g. by heating under reduced pressure, prior to reaching the polymerization temperature.

Where high polymerization temperatures (250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, when using the oligomeric diphenols of the instant invention there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above the amount of the second (higher) alkali metal carbonate or bicarbonate employed is such that there are 0.01 to about 0.25 grams atoms of the alkali metal of higher atomic number per gram atom of sodium.

Thus when using a mixture of carbonates, e.g. sodium carbonate and cesium carbonate, there should be 0.1 to about 20 moles of caesium carbonate per 100 moles of sodium carbonate. Likewise when using a mixture of a bicarbonate and a carbonate, e.g. sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carborate should be added to that in the sodium carbonate when determining the amount of mixed carbonate to be employed.

Preferably, from 0.005 to 0.1 gram atoms of the alkali metal of the second alkali metal carbonate or bicarbonate per gram atom of sodium is used.

Where the oligomeric bisphenol or the oligomeric dihalobenzenoid compound are employed, they should be used in substantially equimolar amounts with respect to the monomeric chain-extending reagent. Excesses lead to the production of lower molecular weight products. However a slight excess, up to 5 mole % of any of the reagents may be employed if desired.

The reaction is carried out in the presence of an inert solvent.

Preferably the solvent employed is an aliphatic or aromatic sulfoxide or sulfone of the formula

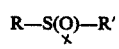

where x is 1 or 2 and R and R' are alkyl or aryl groups and may be the same or different. R and R' may together form a divalent radical. Preferred solvents include dimethyl sulfoxide, dimethyl sulfone, sulfolane (1,1 dioxothiolan), or aromatic sulfones of the formula:

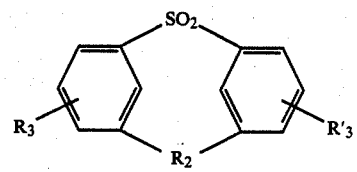

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include N,N'-dimethyl acetamide, N,N-dimethyl formamide and N-methyl-2-pyrrolidone.

The polymerization temperature is in the range of from about 100° to about 400° C. and will depend on the nature of the reactants and the solvent, if any, employed. The preferred temperature is above 270° C. The reactions are generally performed under atmospheric pressure. However, higher or lower pressures may be used.

For the production of some polymers, it may be desirable to commence polymerization at one temperature, e.g. between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The polymerization reaction may be terminated by mixing a suitable end capping reagent, e.g. a mono or polyfunctional halide such as methyl chloride, t-butyl chloride or 4,4'-dichlorodiphenylsulphone with the reaction mixture at the polymerization temperature, heating for a period of up to one hour at the polymerization temperature and then discontinuing the polymerization.

This invention is also directed to an improved process for making the chain-extended polymers in comparatively shorter reaction times overall than by using potassium fluoride alone or by using a combination of sodium carbonate or bicarbonate and a second higher alkali metal carbonate or bicarbonate.

Specifically, this process is directed to preparing the poly(aryl ether ketone) precursors and the chain-extended polymers by the reaction of a mixture of the hydroquinone and 4,4'-difluorobenzophenone (to make the precursor), or the reaction of the precursor to make the chain-extended polymer either one or both in the presence of sodium carbonate and/or bicarbonate an alkali metal halide selected from potassium, rubidium, or cesium fluoride or chloride, or combinations thereof.

The reaction is carried out by heating a mixture of the monomeric reactants or the block precursor and the monomeric coupling agent, as described herein, at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (i250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate or bicarbonate and potassium, rubidium or cesium fluoride or chloride, or combinations thereof employed should be such that there is at least 1 atom of total alkali metal for each phenol group, regardless of the anion (carbonate, bicarbonate or halide).

Preferably, from about 1 to about 1.2 atoms of sodium for each phenol group is used. In another preferred embodiment from 0.001 to about 0.5 atoms of alkali metal (derived from a higher alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, the chloride salts are less active than the fluoride salts so that more chloride and less fluoride is used.

In the chain-extension process the bisphenol and the dihalobenzenoid compound, one of which is oligomeric, are employed in substantially equimolar amounts when maximum molecular weight is sought. However a slight excess, up to 5 mole %, of any of the reactants may be employed if desired. An excess of one over the other leads to the production of low molecular weight products.

The reaction are carried out in the presence of an inert solvent.

The reaction temperature is in the range of from about 100° to about 400° C. and will depend on the nature of the reactants and the solvent, if any, employed. The preferred temperature is above 250° C. The reactions are preferably carried out at ambient pressure. However, higher or lower pressure can also be used. The reaction is generally carried out in an inert atmosphere.

For the production of some chain-extended polymers it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention may be blended with one or more other polymers such as polyarylates, polysulfones, polyetherimides, polyamideimides, polyimides, polyphenylene sulfides, polyesters, polycarbonates, polyamides, polyhydroxyethers, and the like.

The polymers of this invention may be fabricated into any desired shape, i.e., moldings, coatings, films, or fibers. They are particularly desirable for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

Examples

The following examples serve to give specific illustrations of the practice of this invention but they are not intended in any way to limit the scope of this invention.

EXAMPLE 1

Preparation of Hydroxyl-terminated Oligomer (3)

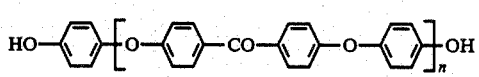

A 250 ml 3-neck flask with slanted side arms fitted with a Claisen arm, nitrogen inlet tube, thermocouple probe, condenser, and stainless steel stirrer was charged with difluorobenzophenone (0.1104 mole, 24.09 gm), hydroquinone (0.115 mole, 12.66 gm), sodium carbonate (0.1173 moles, 12.43 gm, ground and dried), anhydrous potassium fluoride (0.0293 mole, 1.70 gm) and diphenyl sulfone (100 gm). The apparatus was evacuated and filled with argon by means of a Firestone valve connected to the top of the condenser. A flow of high purity nitrogen was begun and the connection to the Firestone valve was replaced with a bubbler. The contents of the flask were heated carefully by means of a heating mantle and temperature controller to melt the diphenyl sulfone. The reaction mixture was stirred and heated to 200° C. and held 30 minutes, held at 250° C. for 1 hour, and finally at 270° C. for 2 hours. The reaction mixture was poured from the reaction flask, cooled, ground to a fine powder, and a sample refluxed successively twice with acetone, once with 2% hydrochloric acid, once with water, and washed thoroughly with acetone. The dried (120°, vacuum oven) sample gave a reduced viscosity (1% in conc. sulfuric acid, 25° C.) of 0.53 dl/gm. Based on reactant stoichiometry this oligomer had the structure (3) as depicted above.

EXAMPLE 2

Preparation of the oligomer (3) using a slightly modified procedure

The oligomer was prepared essentially as in Example 1 except that less potassium fluoride (0.01465 moles, 0.85 gm) was used and the reaction mixture was heated at 200° C. for 30 minutes, at 250° C. for 1 hour, and then at 290° C. for 2 hours. The isolated oligomer had a reduced viscosity of 0.51 dl/gm (concentrated sulfuric acid, 1gm/100 ml at 25° C.).

EXAMPLE 3

Coupling of the Hydroxyl-terminated Precursors to High Polymer

The oligomer was prepared essentially by the procedure of Example 1. When the 2 hour heating period at 270° C. was complete, 1,4-bis(4-fluorobenzoyl)benzene (0.0058 mole, 1.87 gm, recrystallized) was added to the stirred reaction mixture along with 8.0 gm of diphenyl sulfone. The reaction mixture was then heated to 290° C., held 30 minutes, and then heated to 320° C. After 1.6 hours, the viscous reaction mixture was removed from the flask, cooled, and ground. The reaction mixture was refluxed successively (500 ml, 1 hr) with acetone (2X), water, 2% hydrochloric acid, water, and acetone and dried at 110°–120° C. in a vacuum oven overnight (about 12 hours).

The polymer had a reduced viscosity (1% in concentrated sulfuric acid at 25° C. of 1.10 dl/gm.

The polymer was compression molded (20 mil) and tested for tensile strength and modulus according to ASTM-D-638, yield elongation and elongation at break according to ASTM-D-638 and pendulum impact strength according to ASTM-D-256. The results were as follows:

| | |
|---|---|
| Tensile modulus | 375,000 psi |
| Tensile strength | 13,600 psi |
| Yield elongation | 6.2% |
| Break elongation | 55% |
| Pendulum impact | 164 ft-lb/in$^3$ |

Melt flow (1P) of the polymer was 2.48 dgm/min after 10 min at 400° C.

EXAMPLE 4

The polymerization of Example 3 was repeated using twice the amount of all ingredients and a 500 ml reaction flask. After 2 hours at 320°, the polymerization was stopped and the recovered polymer worked up as in Example 3. The polymer had a reduced viscosity of 1.17 dl/gm. The polymer was compression molded and tested as described in Example 3. The results were as follows:

| | |
|---|---|
| Tensile modulus | 337,000 psi |
| Tensile strength | 13,300 psi |
| Yield elongation | 7.0% |
| Break elongation | 15.0% |
| Pendulum impact | 140 ft-lb/in$^3$ |

EXAMPLE 5

The reaction of Example 2 was repeated using twice the amounts of all ingredients (500 ml flask). After heating at 290° C. for 2 hours, 1,4-bis(4-fluorobenzoyl)benzene (0.0115 mole, 3.71 gms, recrystallized) was added to the reaction mixture along with 10 gms of diphenylsulfone. The mixture was heated at 290° C. for 30 minutes and the temperature raised to 320° C. After 1.5 hours the reaction mixture was removed and worked up as in Example 3. The polymer had a reduced viscosity of 0.96 dl/gm (concentrated sulfuric acid, 1gm/100 ml at 25° C.). The polymer exhibited excellent melt flow of 13.20 dgm/min at 400° C. after 10 minutes (1P) and 13.73 dgm/min after 30 minutes.

The polymer was compression molded and tested as described in Example 3. The results are as follows:

| | |
|---|---|
| Tensile modulus | 374,000 psi |
| Tensile strength | 13,800 psi |
| Yield elongation | 7.3% |
| Break elongation | 11.3% |
| Pendulum impact | 51 ft-lb/in$^3$ |

EXAMPLE 6

The preparation of several hydroxyl-terminated oligomers is summarized in Table I. The technique used was similar to that of example 1.

TABLE I

| Mole ratio of 4,4-difluoro-benzophenone/hydroquinone | DP | $M_n^{(1)}$ | Reduced viscosity$^{(2)}$ |
|---|---|---|---|
| 0.98 | 99 | 14,300 | — |
| 0.97 | 66 | 9,500 | 0.45 |
| 0.96 | 49 | 7,000 | 0.40 |

TABLE I-continued

| Mole ratio of 4,4-difluoro-benzophenone/hydroquinone | DP | Mn[1] | Reduced viscosity[2] |
|---|---|---|---|
| 0.95 | 39 | 5,600 | — |

[1] Approximate number average molecular weight values (calculated).
[2] Measured at 25° C. in conc. $H_2SO_4$ (1 gm of polymer in 100 ml of acid)

EXAMPLE 7

The precursor and the chain-extended poly(aryl ether) were prepared using techniques described in the foregoing examples. The initial mole ratio of 4,4-difluorobenzophenone/hydroquinone was 0.985, and 4,4'-dichlorodiphenylsulfone was the coupling agent. The final polymer showed a reduced viscosity in conc. $H_2SO_4$ (1 gm of polymer/100 ml. of acid, 25° C.) of 1.94.

EXAMPLES 8-10

Preparation of halogen-terminated precursors and their coupling with diphenols

The experimental techniques were the same as those used in the examples above. The experiments are summarized in Table II.

TABLE II

| Example | Mole ratio: 4,4-'difluoro benzophenone/hydroquinone | Coupling Agent, moles | Reduced Viscosity (25° C., conc. $H_2SO_4$; 1 gm/100 ml) |
|---|---|---|---|
| 8 | 1.02 | 4,4-dihydroxybenzo-phenone, 0.02 moles | 0.16 |
| 9 | 1.02 | 4,4'-dihydroxydiphenyl-sulfone, 0.02 moles | 0.18 |
| 10 | 1.02 | 4,4'-biphenol, 0.02 moles | 0.81 |

EXAMPLE 11

A 250 ml Ace Glass resin kettle flask was fitted with a head containing a mechanical stirrer, a stainless steel gas inlet tube, a stainless steel thermocouple probe connected to a digital temperature controller, and an adapter containing a dropping funnel and a Dean-Stack trap connected to a condenser. The flask was charged with 100 gms of diphenyl sulfone, 12.66 gms (0.115 moles) of hydroquinone, 24.59 gms (0.1127 moles) of 4,4'-difluorobenzophenone, 9.325 gms (0.0880 moles) of anhydrous sodium carbonate, 4.053 gms (0.0293 moles) of anhydrous potassium carbonate, and 35 ml of xylene.

The contents were heated to 200° C. with stirring started as soon as the mass became molten, and maintained there for one hour while adding xylene dropwise through the dropping funnel. It was then heated to 250° C. and held there for about ½ hour after which the xylene addition was stopped and 1.119 gms (0.0035 moles) of 1,4-bis(p-fluorobenzoyl) benzene (coupling agent) was added. The temperature was raised to 320° C. and held there until molecular weight was reached (about 2 hours in this case).

The polymer was isolated by pouring the flask contents into a metal pan, grinding the cooled mass through a 2.0 micron screen, followed by reflux extraction for one hour with 600 ml of acetone followed by filtration and two washes with acetone on the funnel. The granular material was then reflux extracted with about 600 ml of distilled water for one hour followed by filtration and two washes with water on the funnel. The wet polymer was dried in a vacuum oven at 120° C.

The polymer had a reduced viscosity of 1.02 as measured in concentrated sulfuric acid at 25° C. at 1% concentration.

What is claimed is:

1. A poly(aryl ether ketone) of the following formula:

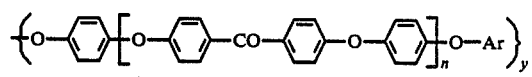

y is greater than one, and Ar is a residue of an activated dihalo or dinitro aromatic compound selected from one or more of the following:

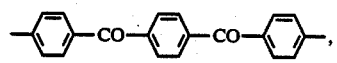

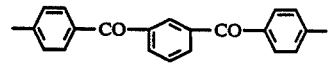

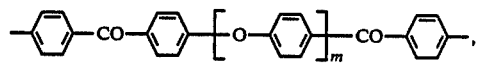

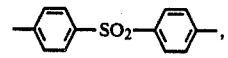

and

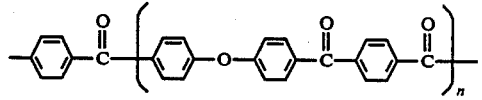

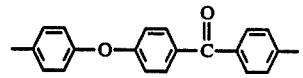

or mixtures thereof, and wherein m is 1 to 3, and each n is independently at least 2.

2. A poly(aryl ether ketone) of the following formula:

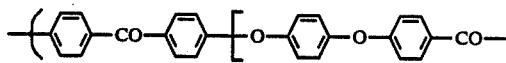

wherein n is at least 2, y is greater than 1 and Ar' is a residue of a diphenol selected from one or more of the following:

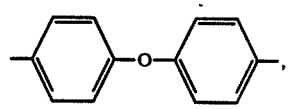

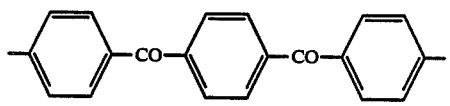

-continued

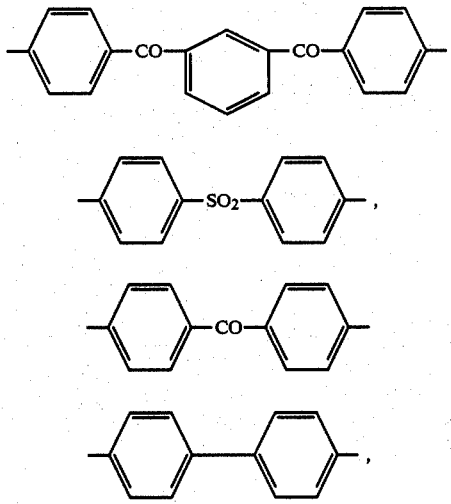

or mixtures thereof.

3. A process for preparing the chain-extended poly(aryl ether ketone) of claim 1 which comprises:
   (a) reacting an excess of hydroquinone with 4,4'-dihalo or dinitro benzophenone in a mole ratio of from 1.5:1 to 1.02:1 in an aprotic solvent at a temperature of from about 100° C. to about 400° C. to yield a hydroxyl-terminated intermediate, and
   (b) further chain-extending the intermediate obtained in step (a) with from 1 to 1.05 times an equimolar amount of an activated aromatic dihalo or dinitro compound which is different from 4,4'-dihalo or dinitro benzophenone.

4. A process for preparing the chain extended poly(aryl ether ketone) of claim 2 which comprises:
   (a) reacting an excess of 4,4'-dihalo or dinitro benzophenone with hydroquinone in a mole ratio of from 1.5:1 to 1.02:1 in the presence of an aprotic solvent at a temperature of from about 100° C. to about 400° C. to yield a dihalo or dinitro terminated intermediate, and
   (b) further chain-extending the intermediate obtained in step (a) with from 1 to 1.05 times an equimolar amount of an aromatic dihydroxy compound which is different from hydroquinone.

5. A process as defined in claims 3 or 4 which is conducted in the presence of a sufficient amount of an alkali metal carbonate and/or bicarbonate or mixtures thereof to provide at least one atom of alkali metal for each phenol group.

6. A process as defined in claim 5 wherein the alkali metal carbonate is sodium carbonate or bicarbonate and potassium carbonate or cesium carbonate, or mixtures thereof.

7. A process as defined in claim 5 wherein the reaction is carried out in the presence of sodium carbonate and/or bicarbonate and potassium, rubidium or cesium fluorides or chlorides.

8. A process as defined in claims 3 or 4 wherein the aprotic solvent is an aliphatic or aromatic sulphoxide, sulphone, or mixtures thereof.

* * * * *